(12) United States Patent
Chen et al.

(10) Patent No.: US 6,649,897 B2
(45) Date of Patent: Nov. 18, 2003

(54) TRANSMISSIVE/REFLECTIVE SCANNER

(75) Inventors: Wen Shu ("Bonny") Chen, Hsinchu (TW); Loi Han, Alhambra, CA (US)

(73) Assignee: Microtek International, Inc., Hsinchu (TW)

( * ) Notice: Subject to any disclaimer, the term of this patent is extended or adjusted under 35 U.S.C. 154(b) by 0 days.

(21) Appl. No.: 10/058,888

(22) Filed: Jan. 25, 2002

(65) Prior Publication Data

US 2003/0141442 A1 Jul. 31, 2003

(51) Int. Cl.⁷ .................................................. H04N 1/04
(52) U.S. Cl. ...................... 250/208.1; 250/234; 358/474
(58) Field of Search ................................. 250/234, 235, 250/236, 208.1; 358/487, 497, 474, 506, 505, 475, 509

(56) References Cited

U.S. PATENT DOCUMENTS

| | | | | | |
|---|---|---|---|---|---|
| 4,023,887 | A | * | 5/1977 | Speers | 385/50 |
| 4,821,730 | A | * | 4/1989 | Wurster et al. | 600/439 |
| 5,574,274 | A | * | 11/1996 | Rubley et al. | 250/208.1 |
| 5,705,805 | A | * | 1/1998 | Han | 250/208.1 |
| 5,814,809 | A | * | 9/1998 | Han | 250/208.1 |

* cited by examiner

*Primary Examiner*—Diego Gutierrez
*Assistant Examiner*—Tania C. Courson
(74) *Attorney, Agent, or Firm*—Jon E. Hokanson, Esq.; Coudert Brothers LLP

(57) ABSTRACT

A transmissive/reflective optical scanner including a gravity assist optical switch that reconfigures a flat bed scanner adapted for transmissive scanning into a flat bed scanner adapted for reflective scanning.

6 Claims, 4 Drawing Sheets

TRANSMISSIVE/REFLECTIVE SCANNER

BACKGROUND OF THE INVENTION

A. Field of the Invention

The present invention is directed to a flat bed scanner having the ability to scan both reflectively and transmissively, through use of a series of mirrors, including a switch mirror that defaults, by operation of gravity, into the transmissive mode position.

B. Description of the Prior Art

Transmissive/reflective scanners are known, for example the transmissive/reflective scanner of U.S. Pat. No. 5,705,805 provides for a series of mirrors, including a switch mirror by which the scanner mode of operation may be changed from reflective to transmissive and vice versa. In the scanner of the '805 patent the switch mirror is operated from transmissive to reflective position, and vice versa, through solenoid switches operated through movement of the carriage by stepper motors.

OBJECTS AND SUMMARY OF THE INVENTION

It is an object of the invention to provide a transmissive/reflective optical scanner that has few moving parts, is simpler and more reliably converted from reflective to transmissive and vice versa modes of operation than the prior art transmissive/reflective flat bed scanners.

With reference to the above-described object, the present invention provides a transmissive/reflective flat bed scanner by which the optical switch mirror has a gravity assist default position which orients the scanner for transmissive scanning, and a second position that requires rotating the switch mirror into a position whereby reflective optical scanning may take place.

DESCRIPTION OF THE PREFERRED EMBODIMENTS

With reference to FIGS. 1–8, a preferred embodiment of the present invention will be described. FIGS. 1–4 provide different views of the scanner of the present invention in a transmissive scanning mode of operation and FIGS. 5–8 provide corresponding views of the scanner in a reflective scanning position.

Figure 1:
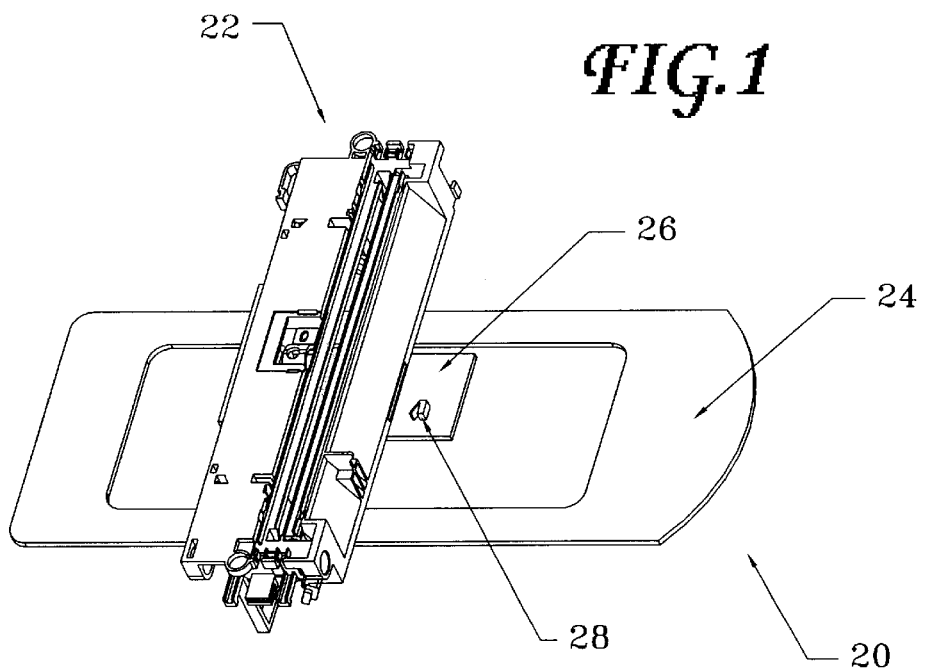
FIG. 1 is a perspective view showing the carriage and light switch plate of a first embodiment of the present invention.
Figure 2:
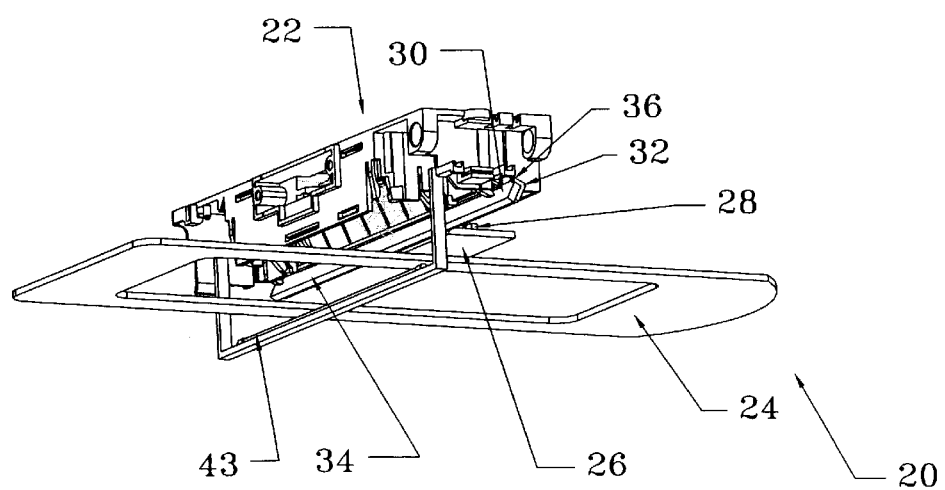
FIG. 2 is a perspective view of the FIG. 1 embodiment, taken from an angle below and to the side of the FIG. 1 embodiment.

The preferred embodiment of the present invention is a transmissive/reflective optical scanner of the type described in U.S. Pat. No. 5,705,805, which is incorporated herein by reference. As shown in the '805 patent, a flat bed scanner is shown, particularly in FIG. 1 of the '805 patent to include on its top surface a platen, and inside of its housing a carriage, mirrors, a lens and a stepper motor adapted to perform reflective scanning of an object placed on the platen. As also shown in FIG. 1 of the '805 patent, a transparency scanning platform 32 is provided for insertion into a slot 35 within the housing of the scanner. As shown in FIG. 2 of the '805 patent, the internal carriage 22 is adapted with a frame 70 that houses a switch mirror 60 which in turn may be rotated to a transmissive scanning position whereby light reflected through the transparency is reflected from the mirrors into the lens at CCD. As may also may be seen from the '805 patent, the transmissive/reflective scanning capability is achieved through use of a relatively large number of components as related to the operation of the switch mirror 60, in comparison to the relatively few number of components of the switch mirror used in the present invention.

Figure 3:
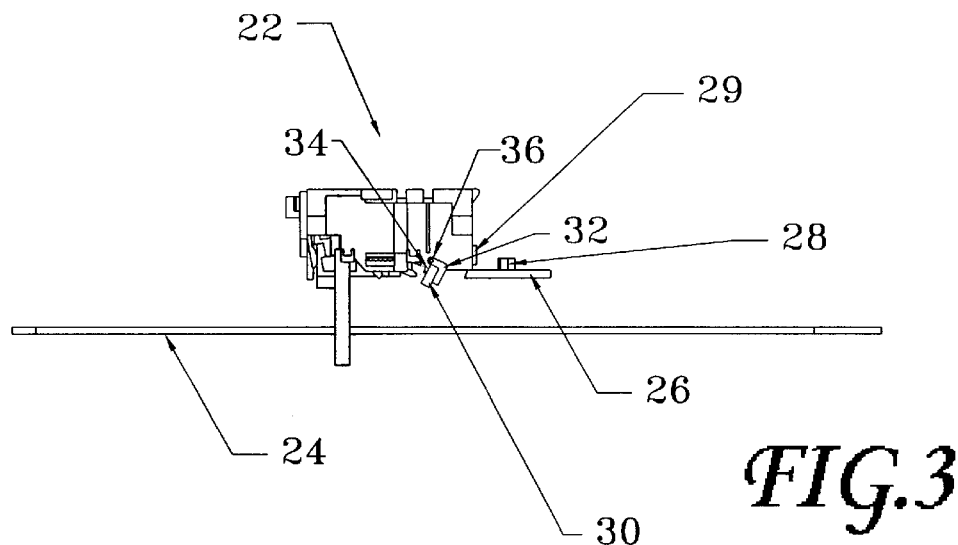
FIG. 3 is a cross-sectional side view of the FIG. 1 embodiment.
Figure 4:
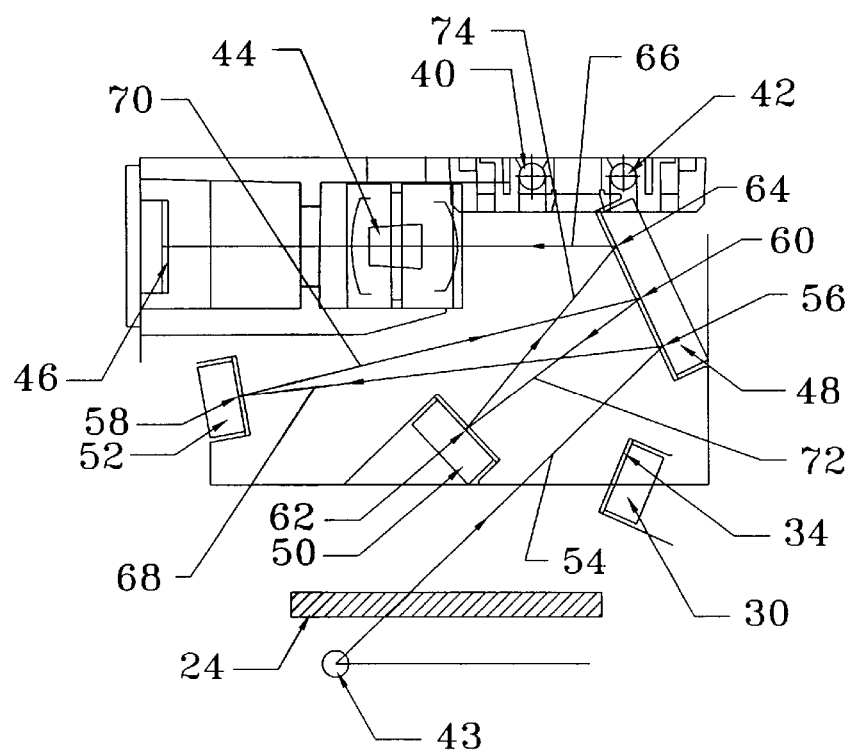
FIG. 4 is a cross-sectional schematic view of the FIG. 1 scanner adapted for transmissive scanning and showing the path of light during transmissive scanning.

Referring to FIGS. 1–4 the transmissive/reflective scanner of the present invention will be described in its transmissive scanning configuration. FIG. 1 shows a carriage 22, transmissive film holder 24, and the switch plate 26 shown collectively as the switching subassembly 20. The switch 28 is positioned on top of the switch plate 26. Preferably the switch 28 is a sub-mini snap action switch with a short lever, part No. 30-2501 manufactured by LKG Industries, Rockford, Ill. The switch is rated at 5 amps at 125 volts AC, or 3 amps 250 volts AC. FIG. 2 shows the switch subassembly 20 from a bottom perspective view and in this view the switch mirror 30 is shown in its default position. The switch mirror 30 is of a rectangular, bar shaped configuration as shown at reflecting surface 34, which is positioned on an L angle support 32. The L angle support 32 is rotatably connected to a pivot 36 in a conventional fashion. As shown in FIG. 2 the switch mirror 30 is hanging freely in its default position. FIG. 3 is a cross-sectional view of the switch sub-assembly 20 components as shown in the different views of FIGS. 1 and 2. In FIG. 3 it may be seen that the switch plate 26 and the switch 28 are positioned away from the carriage 22 so that the switch 28 is not in contact with contact strip 29 and thus the transmissive light 43, shown at FIG. 4 is in its "on" position to reflect that the scanner is in its default, or transmissive scanning configuration.

Figure 8:
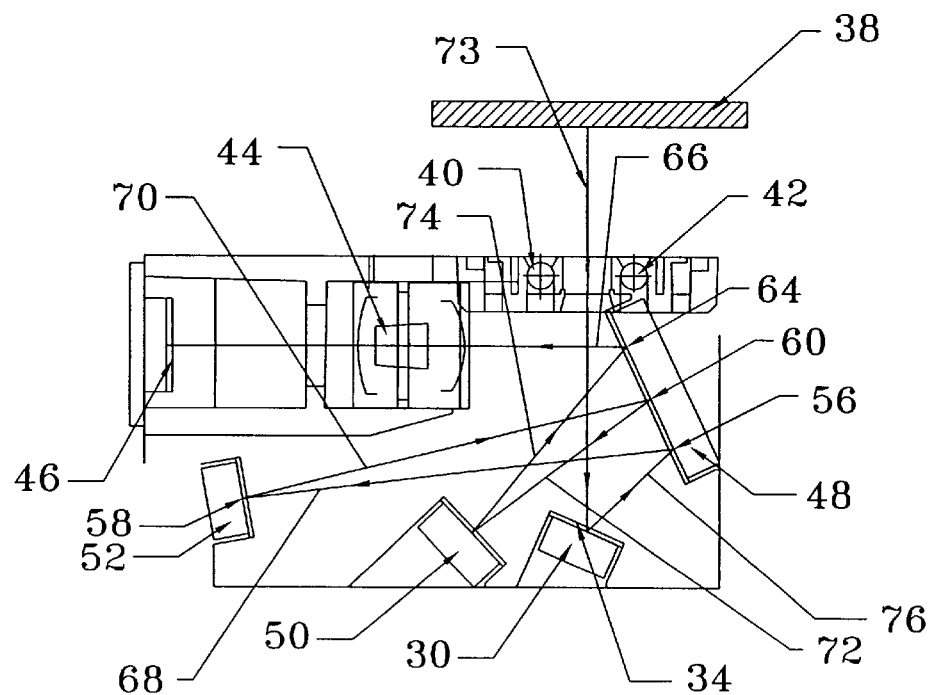
FIG. 8 is a cross-sectional schematic view of the FIG. 1 scanner adapted for reflective scanning and showing the path of light during reflective scanning.

FIG. 4 is also a cross-sectional view of the scanning sub-assembly of FIGS. 1–3, and, additionally other components shown to define the path of light from the transmissive scanning platform 24 to the CCD 46. Shown in FIG. 8 is the reflective scanning platform, or platen 38 at the top, and the transmissive scanning platform 24 shown at the bottom overlying transmissive scanning light source 43. The gravity switch mirror 30 is shown with its reflecting surface 34 in the default position. In this default position the switch mirror 30 is out of the path light from the transmissive scanning surface to the CCD 46. During operation as a transmissive scanner, the path of light begins at the transmissive scanning surface 24 and extends in segment 54 from the transmissive scanning platform 24 to the first mirror 48 at the region shown at 56, where the light is then reflected along path 68 to the second mirror 52 and, at 58 is reflected in path 70 to the first mirror 48 where, at 60 it is reflected along path 72 to third mirror 50 and at 62 is then reflected back to first mirror 48 along path 74. The light is then reflected from first mirror 48 at 64 on path 66 to the lens 44 where the light is focused onto the CCD 46. Light sources 40 and 42, used for reflective scanning, are not energized during this phase of operation. As is shown, with switch mirror 30 in its default position, it hangs out of the path of light from the transmissive scanning platform to the CCD.

Figure 5:
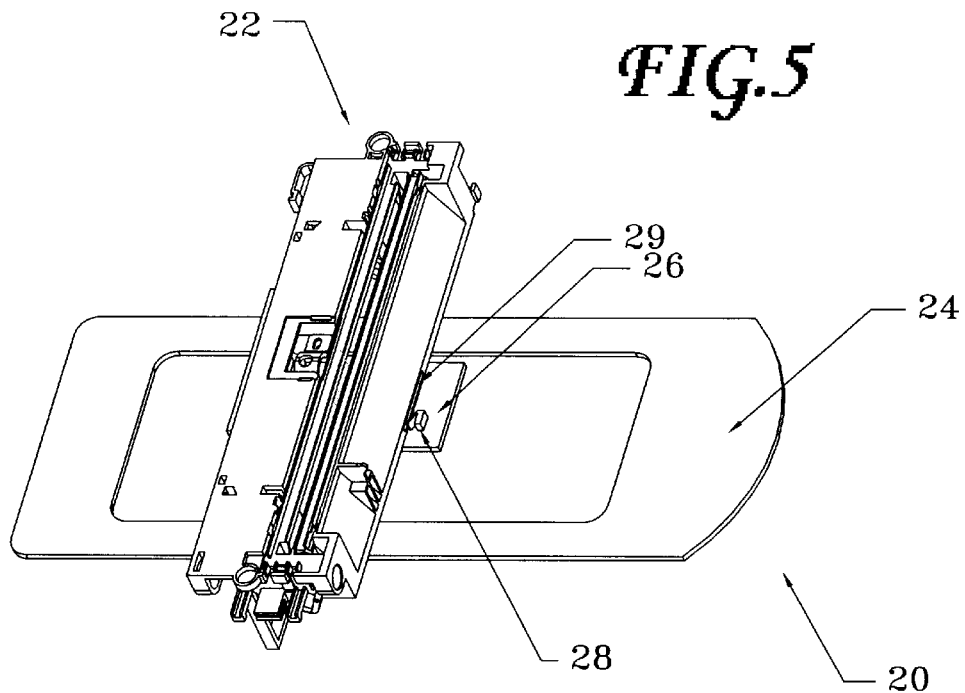
FIG. 5 is a perspective view of the FIG. 1 scanner, but shown in a reflective scanning position.
Figure 6:
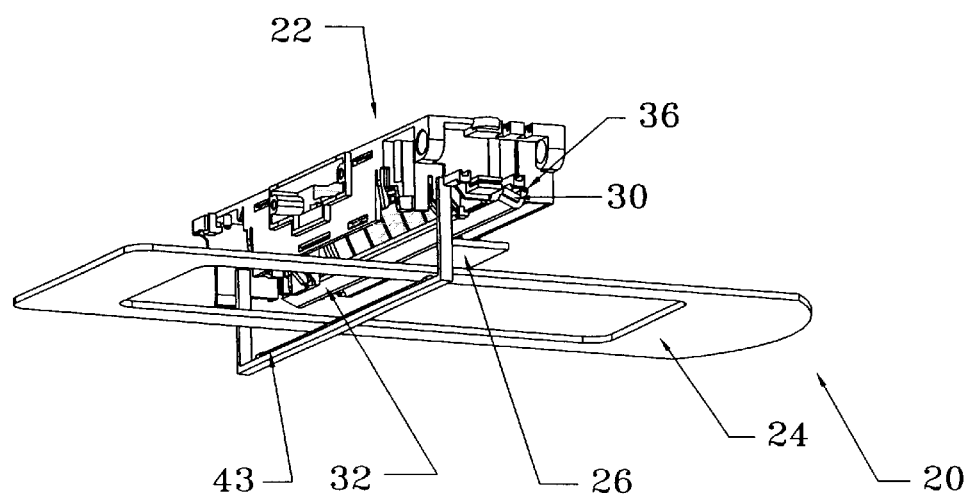
FIG. 6 is a side perspective view of the FIG. 1 scanner, taken from an angle beneath the scanner carriage and showing the scanner in a reflective scanning position.
Figure 7:
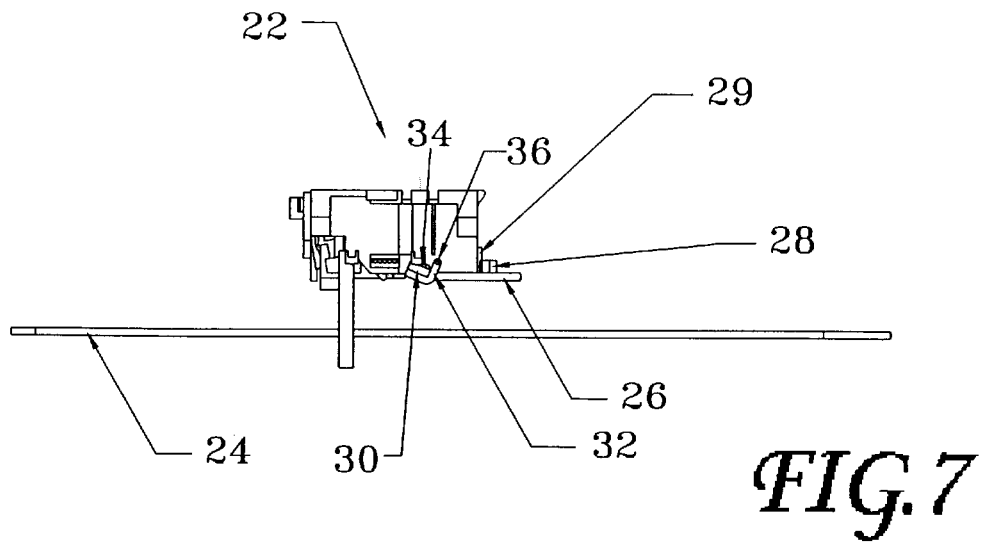
FIG. 7 is a side cross-sectional view of the FIG. 1 scanner, shown in a reflective scanning position.

Referring to FIGS. 5–8 the FIG. 1 scanner will be shown, configured to operate as a reflective scanner. FIG. 5 shows the scan switch sub-assembly 20 including the transmissive plate 24, the switch plate 26 and the switch 28 in contact with strip 29 of the carriage 22. In this position the switch 28 is in contact with the strip 29 and causes the transmissive light source 43 to turn off, and the reflective scanning lights 40 and 42 to be turned on. Referring to FIG. 6, the switch mirror 30 is shown in its reflective position, that is rotated upward through the force the switch plate 26 being inserted and causing the switch mirror 30 to be rotated about its pivot or axle 36 as shown in FIG. 6. FIG. 7, a cross-sectional view of the scanner carriage sub-assembly also shows the mirror 30 rotated in its upward position about the axle or pivot 36. The reflective surface 34 is shown positioned on its L angle backing or support 32.

With reference to FIG. 8, the light path during reflective scanning will be described. An object to be scanned is placed on platen 38 and the light sources 40 and 42 are energized to cause light reflected from a given line Y to generate a path of light from the platen 38 to the switch mirror 30 via path 73. The light is then reflected from the surface 34 of the switch mirror 30 to mirror 48 via path 76 where it is reflected at 56 back to second mirror 52 along path 68. As may be seen by comparing FIG. 8 to FIG. 4, the path of light in the reflective scanning position is the same as the path of light in the transmissive scanning position from the point where it is reflected from the first mirror 48, at 56 through the lens 44 into the CCD 46.

It will be understood that certain features and subcombinations are of utility and may be employed without reference to other features and subcombinations as they are outlined within the description above and within the claims appended hereto. While the preferred embodiments and application of the invention have been described, it is apparent to those skilled I the art that the objects and features of the present invention are only limited as set forth in the claims appended hereto.

We claim:

1. In a transmissive/reflective optical scanning apparatus comprising a scanner housing:
   a carriage;
   two rails extending along the length of the housing and adapted to carry said carriage;
   a reflective scanning platform;
   a transmissive scanning platform;
   a scanning camera positioned proximate to said reflective scanning platform and adapted to selectively view said platforms and generate electrical signals representative of the images viewed; and
   a rotatable optical switch, the improvement comprising a rotatably mounted mirror extending in the width direction across the housing and positioned to set up the apparatus in a transmissive scanning mode;
   a switch plate adapted to rotate said rotatable mirror from a first position to a second position to set up said scanner in a reflective scanning position.

2. A transmissive/reflective optical scanner including a housing having a length dimension, a width dimension and a height dimension, wherein the length dimension is the longest dimension, sources of illumination for transmissive and reflective scanning, and a lens and scanning camera to generate electrical signals representative of images scanned comprising:
   a carriage extending along said width dimension adapted to move reciprocally along said length dimension disposed within said housing;
   a reflective scanning platen disposed in said housing positioned above said carriage;
   a transmissive scanning platen disposed in said housing positioned beneath said carriage;
   said carriage including a switch plate, a first mirror, a second mirror, a third mirror, said lens, said scanning camera and a rotatable switch mirror;
   said rotatable switch mirror is selectively positionable in a default first position or in a second position;
   said rotatable switch mirror is positioned in said default first position by gravity to establish a light path from a scanned object placed on said transmissive scanning platen to a first reflection from said first mirror, thence to said second mirror, thence to a second reflection from said first mirror, thence to said third mirror, thence to a third reflection from said first mirror, thence to said lens and through said lens to said scanning camera;
   said rotatable switch mirror is selectively positioned in said second position by contact with said switch plate to establish a light path from a scanned object placed on said reflective scanning platen to said rotatable switch mirror, thence to a first reflection from said first mirror, thence to said second mirror, thence to a second reflection from said first mirror, thence to said third mirror, thence to a third reflection from said first mirror, thence to said lens and through said lens to said scanning camera.

3. The transmissive/reflective optical scanner of claim 2 wherein that portion of the light path from said transmissive scanning platen and that portion of the light path from said reflective platen located between said first reflection from said first mirror and said scanning camera are identical.

4. The transmissive/reflective optical scanner of claim 2 further including:
   a switch positioned on said switch plate adapted to control illumination for transmissive and reflective scanning;
   said switch adapted to illuminate only said transmissive scanning sources of illumination when said rotatable switch mirror is positioned in said default first position; and
   said switch adapted to illuminate only said reflective scanning sources of illumination when said rotatable switch mirror is positioned in said second position.

5. The transmissive/reflective optical scanner of claim 4 wherein said switch is an LKG Industries 30-2501 sub-mini snap action switch.

6. In a transmissive/reflective optical scanning apparatus comprising a scanner housing:
   a carriage;
   two rails extending along the length of the housing and adapted to carry said carriage;
   a reflective scanning platform;

a transmissive scanning platform;

a scanning camera positioned proximate to said reflective scanning platform and adapted to selectively view said platforms and generate electrical signals representative of the images viewed; and a rotatable optical switch, the improvement comprising a rotatably mounted mirror extending in the width direction across the housing and positioned in a first position to set up the apparatus for transmissive scanning;

a switch plate adapted to rotate said rotatable optical switch from said first position to a second position;

said switch plate removably disposed to position said rotatable optical switch in said second position; and said rotatable optical switch being positioned to set up the apparatus for reflective scanning.

* * * * *